United States Patent [19]
Thomas

[11] Patent Number: 6,006,293
[45] Date of Patent: Dec. 21, 1999

[54] METHOD AND APPARATUS FOR ZERO OVERHEAD SHARING FOR REGISTERED DIGITAL HARDWARE

[75] Inventor: James R. Thomas, Sandy Spring, Md.

[73] Assignee: Comsat Corporation, Bethesda, Md.

[21] Appl. No.: 09/062,896

[22] Filed: Apr. 21, 1998

[51] Int. Cl.⁶ .............................. G06F 13/20; G06F 9/28
[52] U.S. Cl. .............................. 710/45; 710/7; 711/169; 712/42
[58] Field of Search .................. 710/7, 68, 129, 710/45, 25; 712/1, 201, 42, 206, 24; 382/181, 218, 219, 233, 246; 711/169; 704/231

[56] References Cited

U.S. PATENT DOCUMENTS 5,438,665  8/1995  Taniai et al. ............................ 710/25
5,517,657  5/1996  Rodgers et al. ........................ 911/162

*Primary Examiner*—Daniel H. Pan
*Attorney, Agent, or Firm*—Sughrue, Mion, Zinn, Macpeak & Seas, PLLC

[57] ABSTRACT

A time-shared multitask execution circuit for sharing registered digital hardware among a plurality of users is provided to achieve zero overhead switching while processing as few as 1 sample (in one clock cycle) for each user. The circuit comprises a three register bank, two switches, and a dual port RAM. On any given cycle of the clock, one register is processing data of a current user, one register is writing processed data of a prior user to the RAM, and one register is reading data of a subsequent user for processing from RAM. In this manner, processing, reading and writing are decoupled and proceed in parallel.

6 Claims, 4 Drawing Sheets

METHOD AND APPARATUS FOR ZERO OVERHEAD SHARING FOR REGISTERED DIGITAL HARDWARE

FIELD OF THE INVENTION

The present invention relates a method and apparatus for allowing sharing of registered digital electronic hardware between multiple independent channels or users. More particularly, the present invention allows switching between multiple processes to occur with zero overhead so that after processing ends for one user, processing begins on the very next clock cycle for the next user, without intervening cycles dedicated exclusively to switching.

BACKGROUND OF THE INVENTION

The most common application of sharing of digital hardware relates to time-shared computers. This well known method allows a single CPU to be shared among multiple processes (the terms "users", "channels" or "tasks" may be used interchangeably for "processes"). In most applications, the contents of the CPU registers are "swapped" out to RAM during a context switch. Typically, this switch takes many clock cycles, i.e., several clock cycles for each register being saved, where there may be 20 or more registers saved.

More specific to the present invention are applications involving the sharing of pipelined parallel digital hardware, as shown in FIG. 4 illustrating alternating processing devices P and registers R (e.g., a flip-flop). In these applications, RAM is attached directly to each register in the device to allow more rapid context switching. Originally, these systems are presumed to have used two clock cycles for switching, one for writing intermediate results out to RAM and one for reading results back from RAM before continuing processing. In this case, it is possible to process a single sample from one user before switching, but the associated overhead for switching was quite significant (200%). Systems that could supply multiple samples from a single user before requiring a switch benefited from much lower overhead as a result.

In the pending PCT patent application PCT/US97/16349 filed Sep. 19, 1997, entitled "Demodulation of Asynchronously Sampled Data by Means of Detection-Transition Sample Estimation in a Shared Multi-Carrier Environment" by James R. Thomas and Soheil I. Sayegh, a method and device are described for sharing registered digital hardware with only one clock cycle time required for switching overhead. This method can also process one or more samples from a single user before switching. In the case of a single sample, the overhead is then 100%.

However, none of the known conventional methods achieve zero overhead switching and one sample per user between switches. This particular feature is of special interest in digital communications because of the desire to use so-called "polyphase filters" to demultiplex communications channels for processing by digital demodulators. Polyphase filters inherently put out one sample per channel before switching. Other means of demultiplexing, specifically FFT-IFFT processors, naturally produce many samples per channel and are thus well suited for the prior means of sharing, although reducing overhead is still desirable. Alternatively, memory buffers may be used ahead of the equipment to be shared to group samples for processing, but they add significant size and power requirements to the overall processing system. In addition, zero overhead switching has significant application in modern microprocessors, replacing the first method described above, and greatly speeding context switching.

Another conventional alternative to support this type of sharing is the use of a register bank wherein a register is provided for every user, channel, or process at every stage of processing. This approach is simple to implement and supports both zero-overhead switching and one sample per user. However, for large numbers of users, it very inefficient in terms of hardware (e.g., in an ASIC) because as many as 10 gates per bit are required for implementation. For example, in the case of 100 users, an 8 bit data path and 20 stages in the pipeline, the register bank would require 160,000 gates= (20 stages)×(10 gates/bit)×(8 bits)×(10 users).

SUMMARY OF THE PRESENT INVENTION

In accordance with the present invention, a time-shared multitask execution circuit for sharing registered digital hardware between a plurality of users is provided to achieve zero overhead switching while processing as few as 1 sample (in one clock cycle) for each user. The circuit comprises a three register bank, two switches, and a dual port RAM. On any given cycle of the clock, one register is processing data of a current user, one register is writing processed data of a prior user to the RAM, and one register is reading data of a subsequent user for processing from RAM. The three register bank and dual port RAM are essential to the capability to operate on a single sample before switching. In this manner, processing (operation in circuit), reading, and writing are decoupled and proceed in parallel.

BRIEF DESCRIPTION OF THE DRAWINGS

These and other features, aspects and advantages of the present invention will become better understood with reference to the following detailed description, appended claims, and accompanying drawings, wherein:

DETAILED DESCRIPTION OF THE INVENTION

Figure 1:
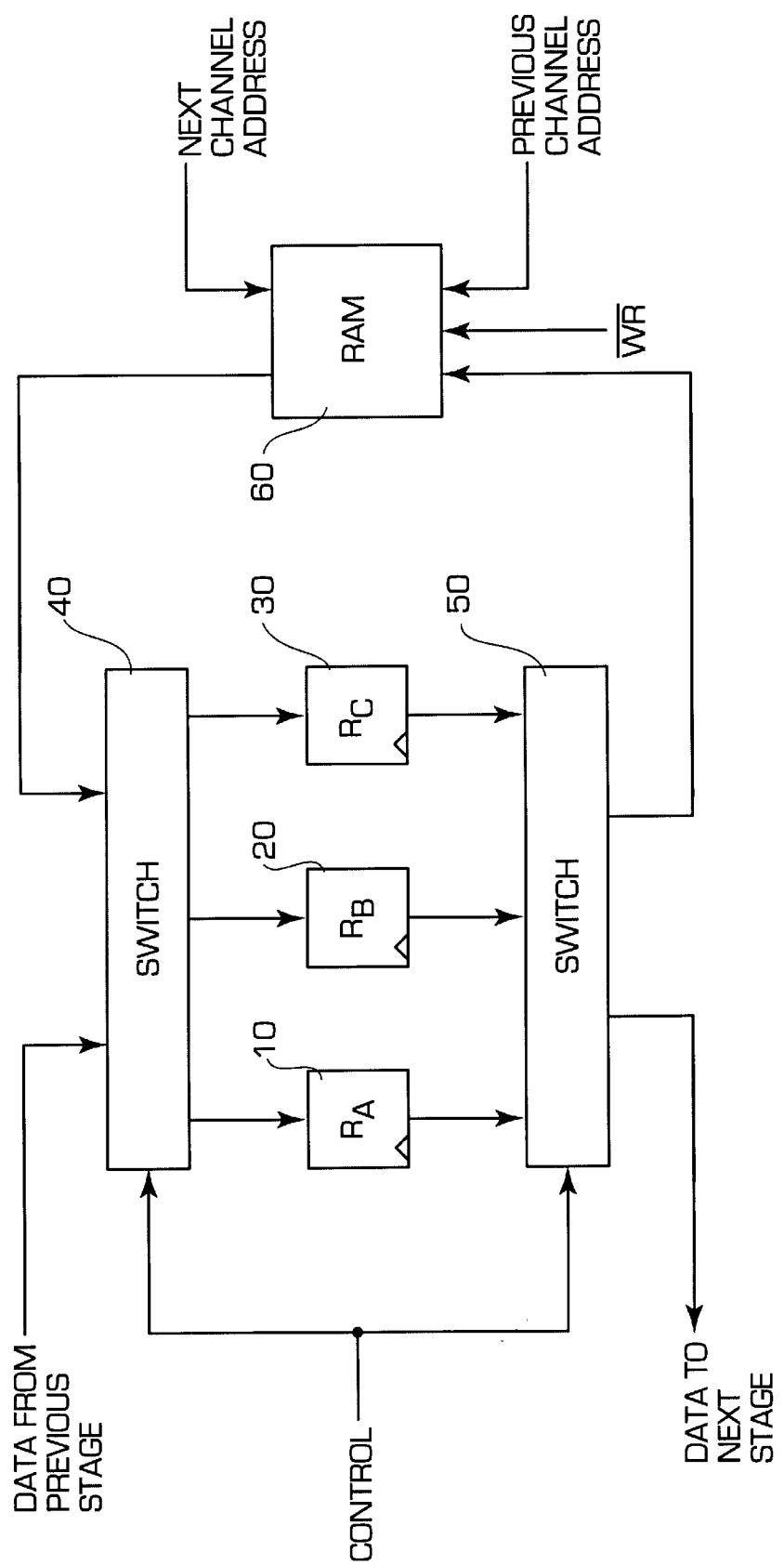
FIG. 1 shows a time-shared multitask execution circuit for sharing registered digital hardware embodying the invention.

Referring to FIG. 1, the present invention comprises a register bank including registers 10, 20 and 30, switches 40 and 50, and dual port random access memory (RAM) 60. At any given clock cycle, one register is in circuit (processing data), one register is writing data to the dual port RAM 60, and one register is reading data from the dual port RAM 60. The switch 40 selects among the registers 10, 20 and 30 for supplying input data from a current user to one of the registers 10, 20 and 30 for processing and supplying input data read from the RAM 60 for a subsequent user to one of the registers 10, 20 and 30. The switch 50 selects among output signals of the registers 10, 20 and 30 to write the processed data of a previous user to the RAM 60 and to supply processed data of a current user to a next stage. Switches 40 and 50 select among registers 10, 20 and 30 in accordance with a control signal received from a controller (not shown). The RAM 60 reads and stores data in accordance with a next channel address and a last channel address received from the controller (not shown).

Figure 2A:
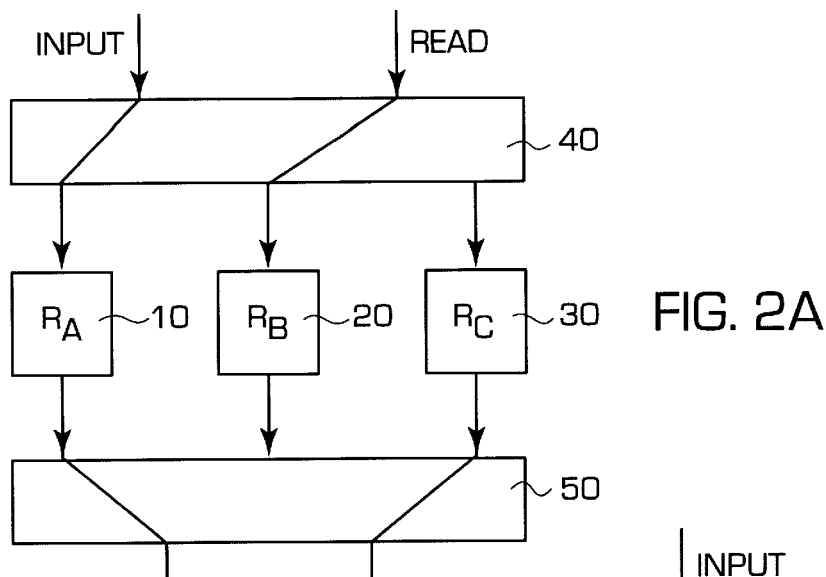
FIG. 2A–2C shows a configuration of the switches for cycling the registers in sequential fashion.
Figure 2B:
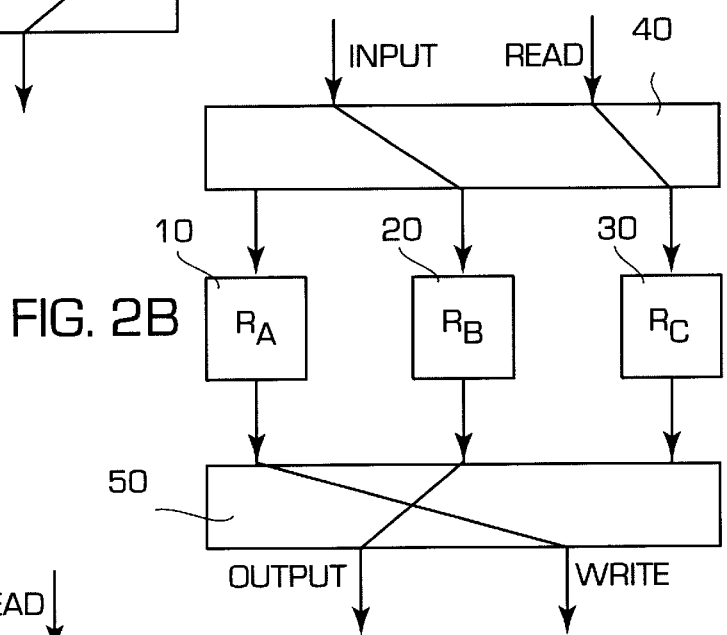
Figure 2C:
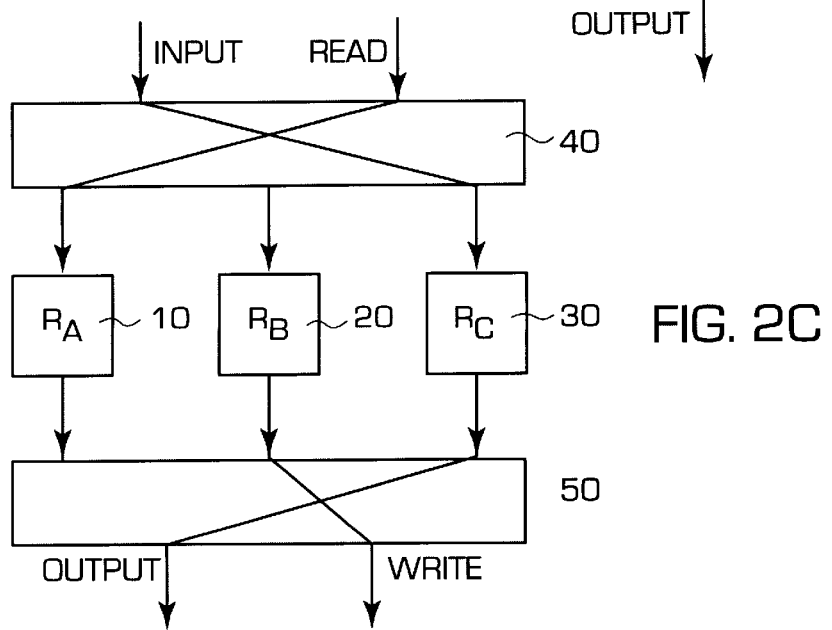
Figure 3:
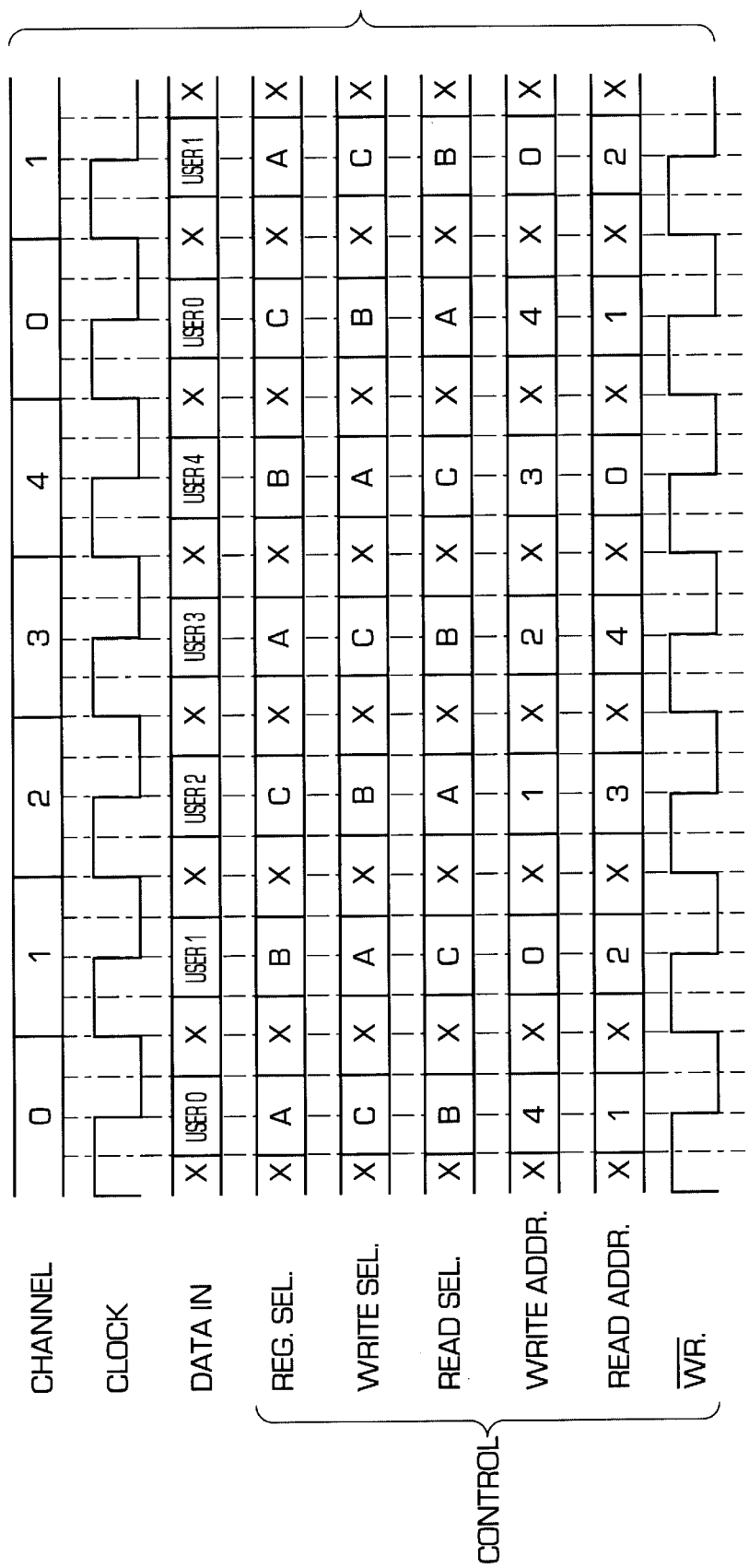
FIG. 3 shows a timing diagram shows of the addresses and switch select signals for processing for a case with five users/channels.
Figure 4:
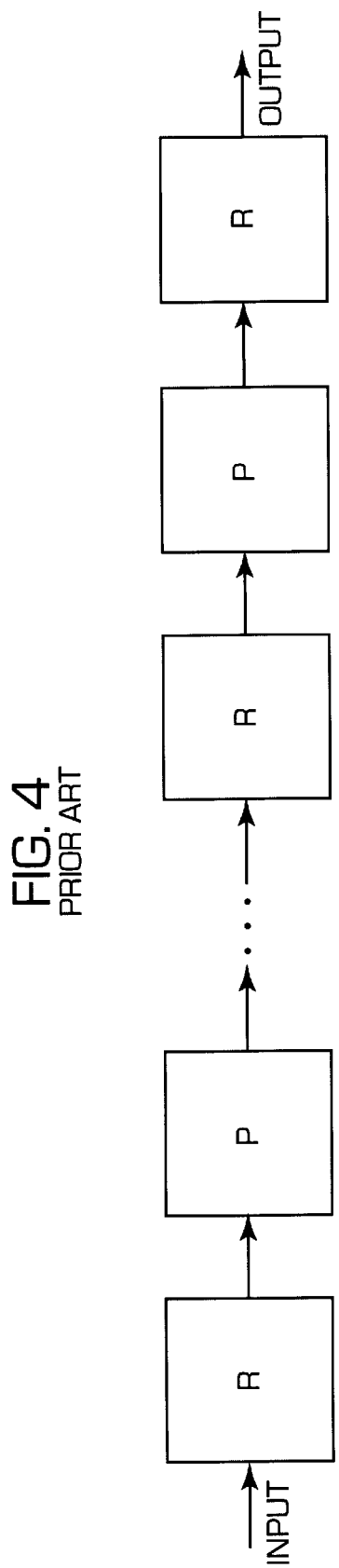
FIG. 4 shows a conventional piplelined digital system.

Operation of the time-shared multitask execution circuit and method for sharing registered digital hardware among a plurality of users will be explained with reference to FIGS. 2A–2C, which illustrate how the switches 40 and 50 are configured to cycle the registers 10, 20 and 30 in a sequential fashion, and FIG. 3, which is a timing diagram showing how the addresses and switch select signals are processed for a case with five users/channels.

During a first clock cycle (FIG. 2A), the register 10 is processing data of a first channel (user 0), the register 20 is reading data from RAM 60 of a second channel (user 1) to be processed after the first channel, and register 30 is writing to the RAM 60 data of a channel which was processed before the first channel. During a second clock cycle (FIG. 2B), the register 10 is writing the processed data of the first channel (user 0) to the RAM 60, the register 20 is processing data of the second channel (user 1), and the register 30 is reading data of a third channel (user 2) to be processed after the second channel from the RAM 60. During a third clock cycle (FIG. 2C), the register 10 is reading data from RAM 60 of a fourth channel (user 3) to be processed after the third channel (user 2), the register 20 is writing to the RAM 60 the processed data of second channel (user 1), and the register 30 is processing data of the third channel (user 2). During a fourth clock cycle, the sequence repeats beginning with the first clock cycle. Hence, the number of channels processed may exceed three and, in fact, is only limited by the number of words in the RAM.

Accordingly, the circuit allows reading and writing to take place in parallel with operation of the in circuit register, thereby implementing zero overhead. The dual port RAM allows simultaneous writing and reading of the intermediate results, thereby supporting the one sample per channel feature.

In addition, the present invention significantly reduces the number of gates required as compared with conventional methods (see Background of the Invention). For example, in the case of 100 users, an 8 bit data path and 20 stages in the pipeline, the register bank would require approximately 46,720 gates:

(8 bits)×(10 users)=40,000 gates for data storage+(20 stages)(10 gates/bit)(8 bits)(3 registers)=4,800 gates+(20 stages) (6 gates/bit) (8 bits) (2 switches)=1,920 gates.

In the limit, the subject invention is approximately four times more gate efficient than the register bank approach (described in the Background of the Invention).

In the field of computers, another application of the present invention is in a microcontroller. That is, a special purpose computer which handles a small set of specialized functions, such as the control of data transfers to and from a hard disk. In a modern server computer, this function is critical to the speed of processing when handling many users. The present invention is ideal for this application since there are many processes or tasks running at once, and many context switches per second. Therefore switching speed is crucial to efficiency of operation, and the subject invention will produce significant improvements in performance.

Another application of the present invention is in network processing. Switchers and routers, such as those used on the Internet, are basically special purpose computers also. In processing many virtual connections there may be many context switches required. Therefore, the present invention has the potential of increasing the speed and efficiency of these operations and thereby increasing total network throughput significantly. Note that these context switches are often the results of so-called "interrupts". The speed of interrupt handling is limited by context switching time. So called "realtime" computers require very fast interrupt service times to respond to events in the real world quickly. Therefore such computers would benefit significantly from the subject invention as well.

The above should not be construed to limit the application of the subject invention to special purpose computers. That is, the present invention is also applicable to general purpose computers, although the improvements obtained may not be as dramatic.

Lastly, one concern which arises in the application of the present invention to computers (and in any very high speed digital hardware) is the access time for the memories in the shared registers. Modern computer CPUs operate at speeds which may be higher than the speeds of the memory required for the present invention. This is not a serious problem, however, because even with added delay for slow memory access, the present invention will be much faster than conventional context switching. For example, if there are 20 registers in the processor which need to be saved in a context switch and it takes 10 machine cycles to save each one, it would take 200 machine cycles for the switch. Whether the subject invention takes zero cycles as with a full speed memory, or 1 or 2 cycles with delays for the memory, it will still be dramatically faster than ordinary task switching. As discussed above, a register bank approach could be used in a CPU for task switching at full speed, but for a case with many tasks running the chip area required would become a problem.

Although certain preferred embodiments of the present invention have been described, the spirit and scope of the invention is by no means restricted to what is described above. For example, the present invention may be practiced in fields of digital signal processing or any application where there are multiple users or processes.

What is claimed is:

1. A time-shared multitask execution circuit for sharing registered digital hardware between a plurality of users, comprising:

a register bank comprising a first register, a second register and a third register;

a first switch having a first input for receiving data from a current user, and outputs respectively coupled to inputs of said first, second and third registers;

a second switch having a first output for outputting processed data to a current user, and inputs respectively coupled to outputs of said first, second and third registers; and a dual port random access memory (RAM) having an input coupled to a second output of said second switch, and an output coupled to a second input of said first switch, said first and second switches selecting between said first, second and third registers so that during every clock cycle one of said first, second and third registers is processing data of a current user, one of said first, second and third registers is reading data of a subsequent user from said RAM, and one of said first, second and third registers is writing data of a prior user to said RAM.

2. A circuit in accordance with claim 1, wherein during a first clock cycle, said first register processes data of a first user, said second register reads data of a second user from said RAM, and said third register writes data of a user prior to said first user to said RAM, during a second clock cycle, said first register writes data of said first user to said RAM, said second register processes data of said second user, and said third register reads data of a third user from said RAM, and during a third clock cycle, said first register reads data of a user after said third user, said second register writes data of said second user to said RAM, and said third register processes data of said third user.

3. A circuit in accordance with claim 1, wherein one of said first, second and third registers processes data of a user during a first clock cycle, writes said processed data of said user to said RAM during a second clock cycle, and reads from said RAM data of a subsequent user during a third clock cycle.

4. A method of sharing registered digital hardware between a plurality of channels including at least a first channel, a second channel and a third channel, said method comprising the steps of:

during a first clock cycle, storing in a first register data of a first channel which is being processed, storing in a second register data read from a RAM of a second channel to be processed after said first channel, and writing to said RAM data stored in a third register of a channel which was processed before said first channel;

during a second clock cycle, writing to said RAM said data of said first channel which is stored in said first register, storing in said second register data of said second channel which is being processed, and storing in said third register data read from said RAM of a third channel to be processed after second channel; and during a third clock cycle, storing in said first register data read from said RAM of a channel to be processed after said third channel, writing to said RAM said data of said second channel which is stored in said second register, and storing in said third register data of said third channel which is being processed.

5. A time-shared multitask execution circuit for implementing time sharing in a computer central processing unit (CPU), comprising:

a register bank comprising a first register, a second register and a third register;

a first switch having a first input for receiving data for a current process, and outputs respectively coupled to inputs of said first, second and third registers;

a second switch having a first output for outputting processed data, and inputs respectively coupled to outputs of said first, second and third registers; and a dual port random access memory (RAM) having an input coupled to a second output of said second switch, and an output coupled to a second input of said first switch, said first and second switches selecting among said first, second and third registers so that during every clock cycle one of said first, second and third registers is a processing data of a current process, one of said first, second and third registers is reading data of a subsequent process from said RAM, and one of said first, second and third registers is writing data of a prior process to said RAM.

6. A method of implementing time sharing in a computer central processing unit (CPU) among a plurality of processes including at least a first process, a second process and a third process, said method comprising the steps of:

during a first clock cycle, storing in a first register data of a first process which is being processed, storing in a second register data read from a RAM of a second process to be processed after said first process, and writing to said RAM data stored in a third register of a process which was processed before said first process;

during a second clock cycle, writing to said RAM said data of said first process which is stored in said first register, storing in said second register data of said second process which is being processed, and storing in said third register data read from said RAM of a third process to be processed after said second process; and during a third clock cycle, storing in said first register data read from said RAM of a process to be processed after said third process, writing to said RAM said data of said second process which is stored in said second register, and storing in said third register data of said third process which is being processed.

* * * * *